United States Patent [19]

Gastinger et al.

[11] Patent Number: 4,837,246

[45] Date of Patent: Jun. 6, 1989

[54] HIGH MOLECULAR WEIGHT DISPERSANTS FOR POLYMER POLYOLS

[75] Inventors: Robert G. Gastinger, West Chester, Pa.; John E. Hayes, Wilmington, Del.

[73] Assignee: ARCO Chemical Technology, Inc., Wilmington, Del.

[21] Appl. No.: 197,938

[22] Filed: May 24, 1988

[51] Int. Cl.⁴ .............................................. C08G 18/14
[52] U.S. Cl. .................................... 521/137; 524/714; 524/732; 524/757; 525/185
[58] Field of Search ................. 521/137; 524/714, 732, 524/757; 525/185

[56] References Cited

U.S. PATENT DOCUMENTS 3,953,393  4/1976  Ramlow et al. ............... 260/31.8 R
4,119,586  10/1978  Shah ...................................... 521/137
4,458,038  7/1984  Ramlow et al. ..................... 521/137

Primary Examiner—Maurice J. Welsh
Attorney, Agent, or Firm—David L. Mossman; Steve Rosenblatt

[57] ABSTRACT

Low viscosity polymer polyol polyols having high styrene/acrylonitrile ratios and good stability may be achieved by the use of a high molecular weight (HMW) dispersant polyol comprising less than 5 wt. % of the total polyol component of the polymer polyol. The HMW dispersant should have a molecular weight higher than about 6000. Preferably, a semi-batch reactor is used, and a relatively high concentration of the HMW dispersant is initially charged to the reactor, relative to the portion of base polyol, which has a molecular weight of less than 4000.

45 Claims, No Drawings

HIGH MOLECULAR WEIGHT DISPERSANTS FOR POLYMER POLYOLS

CROSS-REFERENCE TO RELATED APPLICATION

This application is related to U.S. patent application Ser. No. 197,933, filed of even date, relating to polymer polyols using base polyols having a molecular weight greater than 4000.

FIELD OF THE INVENTION

The invention relates to the synthesis of polymer polyols, and, in one aspect, more particularly relates to styrene/acrylonitrile (SAN) copolymer polyols employing a minor amount of a higher molecular weight polyol as part of the dispersing media.

BACKGROUND OF THE INVENTION

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, usually ethylene oxide and/or propylene oxide, to a molecular weight of about 2,000 to 5,000 and above. These polyols are then reacted with polyisocyanate in the presence of water or other blowing agents such as fluorocarbons to obtain polyurethane foams. Polyols have been modified in many ways in attempts to improve the properties of the resulting polyurethane, for example, by using a polymer polyol as the polyol component. Conventional polyols may be used as the dispersing media or base polyol in these polymer polyols.

For example, dispersions of polymers of vinyl compounds such as styrene, acrylonitrile or a mixture of the two (abbreviated as SAN monomers), or a polyurea polymers such as those prepared from toluene diisocyanate (TDI) and hydrazine in conventional polyols have been included to improve the properties of the polyols, and thus, the properties of the resulting foam. Polyurethane foams with higher load bearing properties (ILD - indentation load deflection or CFD-compression load deflection) may be produced in this manner. It would be desirable if polymer polyols could be prepared which would be stable and have low viscosities. Stability is important to the storage life of the polyols before they are used to make the polyurethane foams. Low viscosities and small particle sizes are important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. That is, the components tend to separate out upon standing during storage. The viscosity and particle size of the resultant polymer polyols are also adversely affected.

U.S. Pat. No. 4,119,586 to Shah contends that the use of a minor amount of a higher molecular weight (HMW) polyol in conjunction with a major amount of a lower molecular weight polyol results in stable, lower viscosity dispersions and permits comparatively higher polymer contents. The lower limit or minimum amount of HMW polyol found to be necessary is around 5%, preferably 10%, of the total polyol. As the HMW polyols are generally more expensive to make and use in comparison to the lower molecular weight polyols, it is desirable to reduce their proportions in the polymer polyols as much as possible. Relatively large amounts of the HMW polyols may also have adverse effects on foam physical properties, and may reduce the hydroxyl number of the final polymer polyol.

Further, the inventors in U.S. Pat. Nos. 3,953,393 and 4,458,038 contend that high styrene content polymer polyols can be prepared by conducting the in situ polymerization in the presence of an alkyl mercaptan as a chain transfer agent in specially formulated, unsaturated polyols where specified and ostensibly critical amounts of unsaturation are necessary. However, the use of alkyl mercaptans in polyurethanes is undesirable because of malodorous qualities of the foams made with these materials. The pungent nature of these chemicals and the foams therefrom render them unacceptable to the consumer, and often to the manufacturer.

SUMMARY OF THE INVENTION

Accordingly, it is an object of the present invention to provide stable, low viscosity dispersions of high styrene to acrylonitrile (SAN) ratios, and a method for making such dispersions. In one aspect of the invention, these SAN ratios may range from about 50/50 to about 85/15.

It is another object of the present invention to provide a particular process for the production of the stable, low viscosity SAN dispersions of the present invention.

It is yet another object of the invention to provide stable, low viscosity dispersions of high SAN ratios employing a blend of a relatively low molecular weight base polyol, and a relatively small proportion, for example only about 5% and less, of a relatively high molecular weight polyol dispersant.

In carrying out these and other objects of the invention, there is provided, in one form, a method for making stable, low viscosity dispersions involving first adding a charge to a reactor, where the charge comprises a first portion of a high molecular weight polyol dispersant and a first portion of a relatively lower molecular weight polyol. The second step involves providing a feed stream to the reactor, where the feed stream comprises at least a second portion of the relatively lower molecular weight polyol, a monomer portion and an initiator suitable for polymerizing the monomer portion. The total of the first and second portions of the high molecular weight polyol dispersant is in the range of about 1 to 20% or less of the total of all portions of both polyols. Optionally, a second portion of the high molecular weight polyol dispersant may be added in the feed stream.

DETAILED DESCRIPTION OF THE INVENTION

It has been discovered that a process using a high molecular weight polyol can produce polymer polyols with both higher polymer solids and higher SAN weight ratios at dispersant contents less than 5 wt. % of the total polyol proportion. The method produces stable, low viscosity polymer polymers at SAN ratios of from 65/35 to 85/15 to even about 50/50 to 95/5. A batch reactor or a semi-batch reactor may be employed. However, as will be shown, a single continuous stirred tank reactor (CSTR) is completely unsuitable for the practice of the method of the invention. A single CSTR is used in U.S. Pat. No. 4,119,586 to Shah, but gives very poor results in the present invention. A plurality of CSTR reactors in series could be employed if the feed to the first CSTR had the higher dispersant proportion fed to it and its product fed into a second CSTR which also received the feed stream. A relatively high concentration of dispersant is initially charged to the reactor to achieve the polymer polyols of the present invention.

In one aspect of the invention, the initial HMW dispersant may comprise all of the charge to the reactor. Alternatively, the HMW dispersant may be diluted up to a ratio of base polyol to HMW dispersant of up to 20:1.

The wt. % of the HMW dispersant in the total polyol component, after the completion of the feed addition, ranges from about 1-20 wt. %. Preferably this ratio ranges from about 1-5 wt. %, where less than 5 wt. % is especially preferred, such as 1-4 wt. %, with 1-3 wt. % as typically preferred. Without dispersants, typical SAN ratios in conventional polymer polyols could only reach as high as the range of about 50-65. In contrast, the SAN ratios that can be supported by the polymer polyols of the present invention range from 50-95, more commonly being in the range of about 65-85. The weight percent of monomers obtainable in accordance with the method of this invention range from about 5-50 %, and more typically in the range of 15-40 %.

The relatively lower molecular weight base polyol preferably has a molecular weight of 4000 or less, and is typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP) α-methylglucoside, β-methylglucoside or other methylglucoside, resins of phenol, aniline and mixed phenol aniline, such as methylenedianiline or bisphenol A, Mannich condensates and mixtures thereof, for example. The base polyol may be made by alkoxylating the initiator with a desired number of moles of an alkylene oxide. Preferably, the alkylene oxide has two to four carbon atoms, and is thus, ethylene oxide, propylene oxide, butylene oxide or mixtures of these oxides. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed.

The high molecular weight polyol dispersant of this invention may have a molecular weight of 6000 or greater, with a preferred molecular weight of 8000 or greater, and an especially preferred range of 10,000 or greater. Its functionality may range from 2 to 4, preferably triols are employed. In one aspect, the functionality of the HMW dispersant averages about 3. The initiators listed above, along with others, may be suitable in providing the HMW dispersants useful herein. As already outlined, one or more alkylene oxides may be added together or in series to the polyhydric or polyfunctional initiators using well known techniques to make mixed or block copolymers. A catalyst may be used; a slightly preferred catalyst for the HMW dispersants is a double metal cyanide catalyst, in particular zinc hexacyanocobaltate, and the dispersant polyols may be prepared in accordance with the methods described in U.S. Pat. Nos. 3,029,505; 3,900,518; 3,941,049 and 4,355,100, incorporated by reference herein. It has been discovered that lower viscosity polymer polyols may result if the HMW dispersant is made using zinc hexacyanocobaltate as the catalyst. Other catalysts may be employed, such as KOH, for example.

The number average molecular weights of the polyols are used herein, and are the theoretical (or apparent) values calculated from theoretical functionality and hydroxyl number. The true number average molecular weights may be somewhat less, depending on how much the true functionality is below the starting or theoretical functionality. Of course, in order to secure stable polymer polyols, the base polyol and the HMW dispersant should be compatible with one another.

The preparation of the polymer polyols of the present invention may be performed at a temperature in the range of 80° to 150° C., preferably in the range of about 100° to 130° C., although the reaction temperature is not particularly critical to the practice of the method of the invention. The proportion of the total polyol in the feed, where total polyol is defined as all portions of both the HMW polyol dispersant and the relatively low molecular weight base polyol, may range from 50 to 99 wt. %, where the preferable proportion of the total polyol in the feed stream ranges from about 65 to 99 wt. %, with an especially preferred range of 80 to 97 wt. %.

The addition time of the feed stream to the reactor contents may range from 0.5 to 4.0 hours, preferably 1 to 2.5 hours, although neither of these ranges are particularly critical. The proportion of the polymerization initiator as a wt. % of the total reactants may range from 0.05 to 5.0 wt. %, preferably 0.1 to 1.0 wt. %.

The preferred monomers employed in the method and polymer polyols of the present invention are both styrene and acrylonitrile to make a copolymer. The relative proportions of styrene to acrylonitrile, the SAN ratio, has been discussed above and will exemplified below. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides such as N-phenylmaleimide, and the like.

The polymerization initiator catalyst may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, 2,2'-azobis(methylbutanenitrile), for example. Other suitable catalysts may be employed, of course.

PROCEDURES FOR MEASUREMENTS OF PHYSICAL PROPERTIES OF POLYMER POLYOLS

Viscosity was measured using a Brookfield cone and plate viscometer, Spindle #CP-52, operated at 20 secs$^{-1}$ at 25° C.

Particle sizes were measured using a Coulter N4 Particle Size Analyzer with o-xylene or isopropyl alcohol as the dispersing media.

Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

The method and polymer polyols of the invention will be further described with respect to the following illustrative examples.

EXAMPLES 1-8

All the polymer polyols prepared according to the method of the invention incorporated some version of the following experimental procedure unless otherwise specified. Into a 3 liter, 4-neck resin kettle equipped with stirrer, condenser, thermometer, addition tube, were charged the indicated amounts of base polyol and dispersant polyol under a blanket of nitrogen. After heating the reactor charge to reaction temperature, the feed charge or stream was added over the indicated time period to give a milk-white polymer polyol. Upon completion of the addition, the polymer polyol was held at the indicated reaction temperature for from 0.5 to 1.0 hours, the soak time or digest time, and then the reaction mixture was stripped for 1.5 to 2.5 hours at about 90° to 120° C. at less than 5 mmHg to yield the polymer polyols.

For examples 1-8, the reaction temperature ranged between 110 and 120° C., the feed addition time was 2.0 hours, the initiator was Vazo 67, which was present in a 0.5 wt. % concentration of the total reactants, and the digestion time was 1.0 hours at 120° C. The effect of using higher SAN ratios at 20 wt. % monomer charge is shown in Table 1. The base polyol for Examples 1-5 had a molecular weight of 3000 (ARCOL®5613), while the molecular weight of the base polyol of Examples 6-8 was 3500 (THANOL®3520). The HMW polyol dispersant was an 11000 molecular weight triol.

TABLE I

| Example No. | 1 | 2 | 3 | 4 | 5 | 6 | 7 | 8 |
|---|---|---|---|---|---|---|---|---|
| Monomer Charge, Wt. % | 20 | 20 | 20 | 20 | 20 | 20 | 20 | 20 |
| SAN Weight Ratio | 67/33 | 67/33 | 67/33 | 67/33 | 75/25 | 70/30 | 70/30 | 70/30 |
| Dispersant | None | 1 | 1 | 1 | 1 | None | 1 | 1 |
| % Dispersant of Total Polyol | — | 1.0 | 3.0 | 5.0 | 5.0 | — | 3.0 | 5.0 |
| % of Total Polyol in Feed | 98 | 98 | 93 | 84 | 89 | 93 | 93 | 89 |
| Reaction Temp., °C. | 110 | 120 | 120 | 120 | 120 | 120 | 120 | 120 |
| Initiator Conc., Wt. % | 0.5 | 0.5 | 0.5 | 0.5 | 0.5 | 0.5 | 0.5 | 0.5 |
| Feed, Addition Time, hr. | 2.0 | 2.0 | 2.0 | 2.0 | 2.0 | 2.0 | 2.2 | 2.0 |
| Feed, g. | | | | | | | | |
| Styrene | 268 | 268 | 268 | 268 | 300 | 280 | 280 | 280 |
| Acrylonitrile | 132 | 132 | 132 | 132 | 100 | 120 | 120 | 120 |
| VAZO 67 | 10.0 | 10.0 | 10.0 | 10.0 | 10.0 | 10.0 | 10.0 | 10.0 |
| Base Polyol | 1564 | 1564 | 1492 | 1420 | 1420 | 1492 | 1492 | 1420 |
| Toluene | 10 | — | 10 | 10 | 10 | — | 10 | 10 |
| Reactor Charge, g. | | | | | | | | |
| Base Polyol | 36 | 20 | 60 | 100 | 100 | 108 | 60 | 100 |
| Dispersant | — | 16 | 48 | 80 | 80 | — | 48 | 80 |
| Polymer Polyol Properties | | | | | | | | |
| Overall Monomer Conv., % | 96 | 96 | 96 | — | — | 93 | 94 | 94 |
| Viscosity cps, 20/sec | 1650 | 1100 | 1110 | 1140 | 1100 | 9090 | 1440 | 1470 |
| Particle Size, μ | — | 1.8 | — | 1.1 | 1.3 | >3.0 | 0.96 | 0.94 |
| Centrifugable Solids, Wt. % | >20 | 7.4 | 2.5 | 1.8 | 2.8 | >20 | 3.5 | 4.0 |

It is evident that stable polymer polyols with acceptable viscosities are possible with less than 5 wt. % HMW polyol, and that increased SAN ratios are also achievable, as in Example 5. Note also that Examples 1 and 6 with no dispersant formed polymer polyols with poor properties, such as high viscosity, large particle sizes, and large centrifugable solids contents.

EXAMPLES 9-13

These examples illustrate varying SAN ratios where the wt. % of dispersant in the total polyol is less than 5 wt. %, that is 3 wt. %, with the exception of example 9 where no dispersant is used, for comparison. The base polyol in examples 9-13 described in Table III was ARCOL ® 5613. Note that the centrifugable solids are 37 wt. %, and the particle size is greater than 3.0 m for example 12. These properties are unacceptable, but this experiment pushes the SAN ratio of 85/15 to the limit with 3% of the total polyol as dispersant. A comparison of examples 10 with example 13 indicates that although the dispersant may vary, the procedure gives similar results. The dispersants in all examples are described in further detail below.

TABLE OF DISPERSANTS

Dispersants 1-4 were prepared according to the procedures described in U.S. Pat. Nos. 3,029,505; 3,900,518; 3,941,049 and 4,355,100 using a zinc hexacyanocobaltate catalyst, and have relatively low unsaturation. Dispersant 5 was prepared using KOH as a catalyst using conventional techniques and has relatively high unsaturation. Dispersants 1-3 have a molecular weight of approximately 10,000, whereas dispersant 4 has a molecular weight of about 8000. Dispersant 5 has a molecular weight of about 9000.

Dispersant 1 is a glycerin initiated polyether of propylene oxide capped with ethylene oxide containing 7% ethylene oxide and having a hydroxyl number of 16 and an unsaturation content of 0.010 meq/g.

Dispersant 2 is a glycerin initiated polyether of propylene oxide having a hydroxyl number of 16 and an unsaturation content of 0.010 meq/g.

Dispersant 3 is a glycerin initiated polyether of propylene oxide and ethylene oxide containing 15% ethylene oxide and having a hydroxyl number of 16 and an unsaturation content of 0.010 meq/g.

Dispersant 4 is a glycerin initiated polyether of propylene oxide capped with ethylene oxide containing 7% ethylene oxide having a hydroxyl number of 19 and an unsaturation content of 0.016 meq/g.

Dispersant 5 is a glycerin initiated polyether of propylene oxide capped with ethylene oxide containing 13% ethylene oxide having a hydroxyl number of 19 and an unsaturation content of 0.097 meq/g.

TABLE II

| Example No. | 9 | 10 | 11 | 12 | 13 |
|---|---|---|---|---|---|
| Monomer Charge, Wt. % | 20 | 20 | 20 | 20 | 20 |
| SAN Weight Ratio | 70/30 | 75/25 | 80/20 | 85/15 | 75/25 |
| Dispersant | 1 | 1 | 1 | 1 | 5 |
| % Dispersant of Total Polyol | 3.0 | 3.0 | 3.0 | 3.0 | 3.0 |
| % of Total Polyol in Feed | 93 | 93 | 93 | 93 | 93 |
| Reaction Temp., °C. | 120 | 120 | 120 | 120 | 120 |
| Initiator Conc., Wt. % | 0.5 | 0.5 | 0.5 | 0.5 | 0.5 |
| Feed, Addition Time, hr. | 2.0 | 2.0 | 2.0 | 2.0 | 2.0 |
| Feed, g. | | | | | |
| Styrene | 280 | 300 | 320 | 340 | 300 |
| Acrylonitrile | 120 | 100 | 80 | 60 | 100 |
| VAZO 67 | 10.0 | 10.0 | 10.0 | 10.0 | 10.0 |
| Base Polyol | 1492 | 1492 | 1492 | 1492 | 1492 |
| Reactor Charge, g. | | | | | |
| Base Polyol | 60 | 60 | 60 | 60 | 60 |
| Dispersant | 48 | 48 | 48 | 48 | 48 |
| Polymer Polyol Properties | | | | | |
| Overall Monomer Conv., % | 95 | 94 | 93 | 90 | 94 |
| Viscosity cps, 20/sec | 1040 | 1020 | 1070 | 970 | 1120 |
| Particle Size, μ | 1.26 | 1.55 | 1.27 | >3.0 | 1.09 |
| Centrifugable Solids, Wt. % | 3.3 | 3.9 | 11.4 | 37 | 5.5 |

EXAMPLES 14-20

Examples 14-20 were performed in a fashion similar to that of examples 9-13, except that THANOL ®F-3520 was used as the base polyol. These examples may be compared with example 6 which does not use a dispersant and gives unacceptable results. Example 17 uses the upper limit SAN ratio of 85/15 and also gives a polymer polyol with higher than desired particle sizes and centrifugable solids. Note that examples 18 and 19, using dispersants 4 and 5, respectively, also give polymer polyols with excellent properties. Although monomer conversion falls off in some of these inventive examples, this phenomenon is primarily due to the increase in styrene content.

TABLE III

| Example No. | 14 | 15 | 16 | 17 | 18 | 19 | 20 |
|---|---|---|---|---|---|---|---|
| Monomer Charge, Wt. % | 20 | 20 | 20 | 20 | 20 | 20 | 30 |
| SAN Weight Ratio | 70/30 | 75/25 | 80/20 | 85/15 | 70/30 | 75/25 | 70/30 |
| Dispersant | 1 | 1 | 1 | 1 | 4 | 5 | 1 |
| % Dispersant of Total Polyol | 3.0 | 3.0 | 3.0 | 3.0 | 3.0 | 3.0 | 3.0 |
| % of Total Polyol in Feed | 93 | 93 | 93 | 93 | 93 | 93 | 89 |
| Reaction Temp., °C. | 120 | 120 | 120 | 120 | 120 | 120 | 120 |
| Initiator Conc., Wt. % | 0.5 | 0.5 | 0.5 | 0.5 | 0.5 | 0.5 | 0.75 |
| Feed, Addition Time, hr. | 2.0 | 2.0 | 2.0 | 2.0 | 2.0 | 2.0 | 2.0 |
| Feed, g. | | | | | | | |
| Styrene | 280 | 300 | 320 | 340 | 280 | 300 | 420 |
| Acrylonitrile | 120 | 100 | 80 | 60 | 120 | 100 | 180 |
| VAZO 67 | 10.0 | 10.0 | 10.0 | 10.0 | 10.0 | 10.0 | 15.0 |
| Base Polyol | 1492 | 1492 | 1492 | 1492 | 1492 | 1492 | 1305 |
| Reactor Charge, g. | | | | | | | |
| Base Polyol | 60 | 60 | 60 | 60 | 60 | 60 | 53 |
| Dispersant | 48 | 48 | 48 | 48 | 48 | 48 | 42 |
| Polymer Polyol Properties | | | | | | | |
| Overall Monomer Conv., % | 91 | 89 | 88 | 83 | 93 | 91 | 96 |
| Viscosity cps, 20/sec | 1400 | 1360 | 1290 | 1180 | 1480 | 1320 | 3210 |
| Particle Size, μ | 1.30 | 1.40 | 1.43 | >3.0 | 0.85 | 1.04 | 1.25 |
| Centrifugable Solids, Wt. % | 2.6 | 3.7 | 12.7 | 32 | 2.2 | 4.0 | 8.6 |

EXAMPLES 21-28

Examples 21-28 were performed in a fashion similar to that of examples 9-13, except that ARCOL® 1130 was used as the base polyol. Again, example 21 which does not use a dispersant gives unacceptable results; the particle size exceeds the limits of the measuring technique and the centrifugable solids are considerably higher than desired. Note that examples 25, 26 and 27, using dispersants 2, 3 and 4, respectively, also give polymer polyols with excellent properties. Example 28 was performed with a considerable difference in the proportion of polyol in the feed: 65%, as opposed to 90% or higher. Negative results occurred in the form of a viscosity of 2110 and increased centrifugable solids of 4.7 wt. %. Thus, this example 28 shows the advantage of adding preferably 65-99 wt. % of the polyol in the feed, where 80-97 wt. % is an especially preferred range.

| Example No. | 21 | 22 | 23 | 24 | 25 | 26 | 27 | 28 |
|---|---|---|---|---|---|---|---|---|
| Monomer Charge, Wt. % | 20 | 20 | 20 | 20 | 20 | 20 | 20 | 20 |
| SAN Weight Ratio | 70/30 | 70/30 | 75/25 | 70/30 | 70/30 | 70/30 | 70/30 | 70/30 |
| Dispersant | — | 1 | 1 | 1 | 2 | 3 | 4 | 1 |
| % Dispersant of Total Polyol | — | 3.0 | 3.0 | 3.0 | 3.0 | 3.0 | 3.0 | 3.0 |
| % of Total Polyol in Feed | 90 | 94 | 94 | 80 | 94 | 94 | 94 | 65 |
| Reaction Temp., °C. | 120 | 120 | 120 | 120 | 120 | 120 | 120 | 120 |
| Initiator Conc., Wt. % | 0.5 | 0.5 | 0.5 | 0.5 | 0.5 | 0.5 | 0.5 | 0.5 |
| Feed, Addition Time, hr. | 1.5 | 1.5 | 1.5 | 2.0 | 2.0 | 2.0 | 2.0 | 2.0 |
| Feed, g. | | | | | | | | |
| Styrene | 280 | 280 | 300 | 280 | 280 | 280 | 280 | 280 |
| Acrylonitrile | 120 | 120 | 100 | 120 | 120 | 120 | 120 | 120 |
| VAZO 67 | 10.0 | 10.0 | 10.0 | 10.0 | 10.0 | 10.0 | 10.0 | 10.0 |
| Base Polyol | 1440 | 1504 | 1504 | 1280 | 1504 | 1504 | 1504 | 1040 |
| Reactor Charge, g. | | | | | | | | |
| Base Polyol | 160 | 48 | 48 | 272 | 48 | 48 | 48 | 512 |
| Dispersant | — | 48 | 48 | 48 | 48 | 48 | 48 | 48 |
| Polymer Polyol Properties | | | | | | | | |
| Overall Monomer Conv., % | 94 | 94 | 92 | 93 | 93 | 92 | 93 | 93 |
| Viscosity cps, 20/sec | 3150 | 1240 | 1200 | 1570 | 1180 | 1280 | 1140 | 2110 |
| Particle Size, μ | >3.0 | 0.96 | 0.91 | 1.09 | 1.19 | 1.13 | 1.05 | 1.08 |
| Centrifugable Solids, Wt. % | >20 | 3.0 | 3.4 | 2.5 | 2.7 | 2.0 | 3.0 | 4.7 |

COMPARATIVE EXAMPLE 29

Examples 29 and 30 are comparative examples of a continuous stirred tank reactor (CSTR) using the HMW dispersants employed in the present invention at 95/5 and 90/10 base polyol/dispersant ratio essentially following the procedures outlined in U.S. Pat. No. 4,119,586 to Shah, example 31 therein, with different residence times. In both cases, a poor product resulted.

To a CSTR containing baffles and stirrer (at 500 rpm) was added a feed containing the following:

| | Parts |
|---|---|
| Styrene | 280 |
| Acrylonitrile | 120 |
| AIBN | 26 |
| ARCOL® 1130 | 1520 |
| Dispersant 1 | 80 |

The residence time in the reactor was maintained at 7 minutes. The temperature of the reactor was maintained at about 128° C. A grainy, seedy product resulted which clogged the reactor outlet. Some product was collected which showed poor polymer polyol stability; it contained 21 wt. % centrifugable solids.

COMPARATIVE EXAMPLE 30

In the manner described in comparative example 29, the following feed was added to a CSTR which was maintained at a temperature of 125° C.:

| | Parts |
|---|---|
| Styrene | 280 |
| Acrylonitrile | 120 |
| AIBN | 26 |
| ARCOL® 1130 | 1520 |
| Dispersant 1 | 160 |

The residence time was 24 minutes. A seedy, grainy product resulted which had poor stability; 23 wt. % centrifugable solids.

PREPARATION OF SLAB POLYURETHANE FOAMS

The polymer polyols prepared in accordance with the above examples may then be incorporated into a formulation which results in a polyurethane product. The polymer polyol of the invention may be used in conjunction with a polyisocyanate such as those mentioned above or may be combined with additional polyols well known in the art, and reacted with a polyisocyanate to form a polyurethane foam product. In these particular examples showing the utility of the polymer polyols of the present invention, slab polyurethane foams are produced. It will be shown that the polymer polyols of the present invention may also be blended with conventional polyols.

In order to form the polyurethane foam, a catalyst useful in preparing foams of this type is employed in the usual manner. Such catalyst may include those mentioned above, or one or more of the following:

(a) Tertiary amines such as trimethylamine, triethylamine, N-methylmorpholine, N-ethylmorpholine, N,N-dimethylbenzylamine, N,N-diemethylethanolamine, N,N,N',N'-tetramethyl-1,3-butanediamine, N,N-dimethylpiperazine, 1,4-diazabicyclo[2.2.2.]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyclaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as Ti(OR)$_4$, Sn(OR)$_4$, Al(OR)$_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

As is well known, the polyol component for the polyurethane foam is reacted in the presence of one or more of the above catalysts with a polyisocyanate according to conventional procedures. The polyisocyanate used may be any aromatic or aliphatic polyisocyanate, such as toluene diisocyanates, polymeric isocyanates and aliphatic diisocyanates. Typical aromatic polyisocyanates include, but are not limited to, m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)-methane, bis(3-methyl-4-isocyanatophenyl)methane, and 4,4'-diphenylpropane diisocyanate. Suitable aliphatic diisocyanates would include isophorone diisocyanate, hexamethylene diisocyanate and methylene-bis-cyclohexylisocyanate. Toluene diisocyanates are preferred.

Aromatic polyisocyanates suitable for use in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyisocyanates and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 wt. % methylene diphenyl diisocyanate isomers with the remainder being polymethylene polyphenyl diisocyanates having higher funtionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone surfactant such as dimethylpolysiloxanes, may also be added to the foaming mixture. Fillers, flame retarding additives, dyes or plasticizers of known types may also be used. These and other additives are well known to those skilled in the art.

The invention and its improvements over the art will now be illustrated with the aid of the following examples. These examples are intended to illustrate the invention, but are not intended to delineate the expected scope of the invention.

Procedure: The polyurethane foams were separately prepared by charging the amounts of polyol, polymer polyol, water, catalysts, silicone surfactant, and flame retardant compound indicated into a oneliter cylindrical container equipped with a mechanical stirrer. The mixture was stirred for about 30 seconds at about 2500 rpm, and the indicated amount of polyisocyanate was introduced into the container with stirring for about 10 seconds. The contents of the container was then immediately poured into a cardboard cake box and the foam was allowed to rise. After the foam rise was completed, the foam was allowed to cure at room temperature for about one week.

| FORMULATION | parts by wt. |
|---|---|
| ARCOL ® 1130 | 60 |
| Polymer Polyol | 40 |
| Water | 4.2 |
| Niax 5750 Surfactant | 1 |
| Niax A-200 Catalyst | 0.23 |
| T-9 Catalyst | 0.15 |
| Thermolin 101 Flame Retardant | 10 |
| TDI Index | 108 |

TABLE V

Slab Polyurethane Foam Preparation

| Foam No. | A | B | C |
|---|---|---|---|
| Polymer Polyol # | 27 | 28 | 24 |
| Foam Reactivity | | | |
| Cream Time, sec. | 7 | 7 | 7 |
| Peak Rate, in/min. | 0.75 | 0.78 | 0.78 |
| Cell Openness, % | 81 | 80 | 81 |
| Density, PCF (lb./ft$^3$) | 1.81 | 1.69 | 1.84 |
| Air Flow, CFM (ft$^3$/min.) | 2.43 | 2.43 | 2.43 |
| Tensile Strength, PSI (lb./in.$^2$) | 13.7 | 15.3 | 14.6 |
| Elongation, % | 114 | 148 | 144 |
| Tear Strength, PLI (lb./linear in.) | 1.33 | 2.1 | 2.05 |
| Compression Set, 90% | 20 | 64.7 | 13.8 |
| HACS[1], 90% | 13.5 | 10.6 | 12.3 |
| CFD, 25% | 0.67 | 0.545 | 0.59 |
| CFD, 40% | 0.72 | 0.585 | 0.645 |
| CFD, 65% | 1.25 | 1.015 | 1.085 |
| CFD, 25% RET. | 0.445 | 0.37 | 0.395 |
| GCFD[2], 25% | 0.37 | 0.32 | 0.32 |
| Sag Factor | 1.87 | 1.86 | 1.82 |
| Recovery, % | 66.42 | 67.89 | 66.39 |

[1]Humid Age Compression Set
[2]Guide Compression Force Deflection

GLOSSARY

ARCOL® 1130: = A glycerin initiated polyether of propylene oxide and ethylene oxide containing about 10% ethylene oxide having a hydroxyl number of 48 and containing essentially secondary hydroxyl groups, made by ARCO Chemical Company.

ARCOL® 5613: = A glycerin initiated polyether of propylene oxide and ethylene oxide containing about 7% ethylene oxide, having a hydroxyl number of 56 and containing essentially secondary hydroxyl groups, made by ARCO Chemical Company.

Niax 5750: = Silicon surfactant, made by Union Carbide Corporation.

Niax A-200: = Amine catalyst, made by Union Carbide Corporation.

T-9: = Organotin catalyst, made by Air Products and Chemicals, Inc.

THANOL®F-3520: - A glycerin initiated polyether of propylene oxide and ethylene oxide containing about 13% ethylene oxide having a hydroxyl number of 48 and containing essentially secondary hydroxyl groups, made by ARCO Chemical Company.

Thermolin 101: = Tetrakis (2-chloroethyl) ethylene diphosphate flame retardant, made by Olin Corporation.

Vazo 67: = 2,2'-Azobis(2-methylbutanenitrile) polymerization catalyst made by E. I. duPont de Nemours and Co.

Thus, it is apparent that the use of a small amount of HMW polyol in the synthesis of SAN containing polymer polyols results in the ability to use higher SAN weight ratios, and higher polymer solids contents along with lower viscosities. Unusually, 5% or less of the total polyol may be the dispersant to achieve these excellent results. Further, the use of a semi-batch reactor with a relatively high concentration of dispersant initially charged to the reactor help achieve these results.

Many modifications may be made in the polymer polyols of this invention and their method of production without departing from the spirit and scope of the invention, which is defined only in the appended claims. For example, one skilled in the art could adjust the temperature, pressure, reactants, proportions and modes of additions within the parameters set forth to provide polymer polyols with particularly advantageous properties, or polymer polyols that give foams with optimal properties.

We claim:

1. A method for making stable, low viscosity polymer polyols comprising the steps of:
    adding a charge to a reactor, where the charge comprises a high molecular weight polyol dispersant;
    providing a feed stream to the reactor, where the feed stream comprises a relatively lower molecular weight polyol having a molecular weight equal to or less than 4000 relatively lower than that of the high molecular weight polyol dispersant, a monomer portion and an initiator suitable for polymerizing the monomer portion;
    where the high molecular weight polyol dispersant is in the range of about 1 to 20% of the total.

2. The method for making polymer polyols of claim 1 where the high molecular weight polyol dispersant is a first portion, and a second portion of the high molecular weight polyol dispersant is present in the feed stream to the reactor.

3. The method for making polymer polyols of claim 2 where the total of the first and second portions of the high molecular weight polyol dispersant is in the range of about 1 to 5% of the total of all portions of both polyols.

4. The method for making polymer polyols of claim 2 where the total of the first and second portions of the high molecular weight polyol dispersant is in the range of about 1 to 3% of the total of all portions of both polyols.

5. The method for making polymer polyols of claim 1 where the high molecular weight polyol dispersant has a molecular weight greater than about 6000 and a functionality ranging from about 2 to 4.

6. The method for making polymer polyols of claim 1 where the monomer portion is a mixture of styrene and acrylonitrile in a ratio of styrene to acrylonitrile of from about 50/50 to 95/5.

7. The method for making polymer polyols of claim 1 where the monomer portion is a mixture of styrene and acrylonitrile in a ratio of styrene to acrylonitrile of from about 65/35 to 85/15.

8. The method for making polymer polyols of claim 1 where the concentration of the high molecular weight polyol dispersant in the charge to the reactor ranges from 10 to 100 wt. % of the total polyol in the charge.

9. The method for making polymer polyols of claim 1 where the reactor is selected from the group of reactors consisting of a batch reactor, a semi-batch reactor and a plurality of continuous stirred tank reactors (CSTRs) in series.

10. The method for making polymer polyols of claim 1 where the viscosity of the resulting polymer polyols is less than about 8000 cps.

11. The method for making polymer polyols of claim 1 where the high molecular weight polyol dispersant is made by adding an alkylene oxide component to a polyfunctional initiator in the presence of a zinc hexacyanocobaltate catalyst.

12. The method for making polymer polyols of claim 1 where the wt. % of the total of both polyols that is present in the feed ranges from 50 to 99 wt %.

13. The method for making polymer polyols of claim 1 where the reactor charge additionally comprises a relatively lower molecular weight polyol having a molecular weight equal to or less than 4000.

14. The method of claim 13 where the relatively lower molecular weight polyol in the reactor charge and the relatively lower molecular weight polyol in the feed stream are the same polyol.

15. The method for making polymer polyols of claim 13 where the high molecular weight polyol dispersant is a first portion, and a second portion of the high molecular weight polycol dispersant is present in the feed stream to the reactor.

16. The method for making polymer polyols of claim 15 where the total of the first and second portions of the high molecular weight polyol dispersant is in the range of about 1 to 5% of the total of all portions of both polyols.

17. The method for making polymer polyols of claim 15 where the total of the first and second portions of the high molecular weight polyol dispersant is in the range of about 1 to 3% of the total of all portions of both polyols.

18. The method for making polymer polyols of claim 13 where the high molecular weight polyol dispersant has a molecular weight greater than about 6000 and a functionality ranging from about 2 to 4.

19. The method for making polymer polyols of claim 13 where the monomer portion is a mixture of styrene and acrylonitrile in a ratio of styrene to acrylonitrile of from about 50/50 to 95/5.

20. The method for making polymer polyols of claim 13 where the monomer portion is a mixture of styrene and acrylonitrile in a ratio of styrene to acrylonitrile of from about 65/35 to 85/15.

21. The method for making polymer polyols of claim 13 where the concentration of the high molecular weight polyol dispersant in the charge to the reactor ranges from 10 to 100 wt. % of the total polyol in the charge.

22. The method for making polymer polyols of claim 13 where the reactor is selected from the group of reactors consisting of a batch reactor, a semi-batch reactor and a plurality of continuous stirred tank reactors (CSTRs) in series.

23. The method for making polymer polyols of claim 13 where the viscosity of the resulting polymer polyols is less than about 8000 cps.

24. The method for making polymer polyols of claim 13 where the high molecular weight polyol dispersant is made by adding an alkylene oxide component to a polyfunctional initiator in the presence of a zinc hexacyanocobaltate catalyst.

25. The method for making polymer polyols of claim 13 where the wt. % of the total of both polyols that is present in the feed ranges from 50 to 99 wt %.

26. A method for making stable, low viscosity polymer polyols comprising the steps of:
adding a charge to a reactor, where the charge comprises a portion of a high molecular weight polyol dispersant having a molecular weight greater than about 6000 and a first relatively lower molecular weight polyol having a molecular weight less than or equal to 4000;
providing a feed stream to the reactor, where the feed stream comprises a second relatively lower molecular weight polyol having a molecular weight less than or equal to 4000, a monomer portion and an initiator suitable for polymerizing the monomer portion,
where the high molecular weight polyol dispersant is in the range of about 1 to 5% of the total of all polyols.

27. The method for making polymer polyols of claim 26 where the high molecular weight polyol dispersant is a first portion, and a second portion of the high molecular weight polyol dispersant is present in the feed stream to the reactor.

28. The method for making polymer polyols of claim 27 where the total of the first and second portions of the high molecular weight polyol dispersant is in the range of about 1 to 5% of the total of all portions of both polyols.

29. The method for making polymer polyols of claim 27 where the total of the first and second portions of the high molecular weight polyol dispersant is in the range of about 1 to 3% of the total of all portions of both polyols.

30. The method for making polymer polyols of claim 26 where the monomer portion is a mixture of styrene and acrylonitrile in a ratio of styrene to acrylonitrile of from about 65/35 to 85/15.

31. The method for making polymer polyols of claim 26 where the concentration of the high molecular weight polyol dispersant in the charge to the reactor ranges from 10 to 50 wt. % of the total polyol in the charge.

32. The method for making polymer polyols of claim 26 where the reactor is selected from the group of reactors consisting of a batch reactor, a semi-batch reactor and a plurality of continuous stirred tank reactors (CSTRs) in series.

33. The method for making polymer polyols of claim 26 where the viscosity of the resulting polymer polyols is less than about 8000 cps.

34. The method for making polymer polyols of claim 26 where the first relatively lower molecular weight polyol and the second relatively lower molecular weight polyol are the same polyol.

35. A method for making stable, low viscosity polymer polyols comprising the steps of:
adding a charge to a reactor, where the charge comprises a first portion of a high molecular weight polyol dispersant having a molecular weight greater than about 6000 and a first portion of a relatively lower molecular weight polyol having a molecular weight less than or equal to 4000, where the concentration of the high molecular weight polyol dispersant in the charge to the reactor ranges from 10 to 50 wt. % of the total polyol in the charge;
providing a feed stream to the reactor, where the feed stream comprises a second portion of the high molecular weight polyol dispersant, a second portion of the relatively lower molecular weight polyol, a monomer portion and an initiator suitable for polymerizing the monomer portion,
where the total of the first and second portions of the high molecular weight polyol dispersant is in the range of about 1 to 5% of the total of all portions of both polyols.

36. The method for making polymer polyols of claim 35 where the monomer portion is a mixture of styrene and acrylonitrile in a ratio of styrene to acrylonitrile of from about 65/35 to 85/15.

37. The method for making polymer polyols of claim 35 where the reactor is selected from the group of reactors consisting of a batch reactor, a semi-batch reactor and a plurality of continuous stirred tank reactors (CSTRs) in series.

38. The method for making polymer polyols of claim 35 where the total of the first and second portions of the high molecular weight polyol dispersant is in the range of about 1 to 3% of the total of all portions of both polyols.

39. Stable, low viscosity polymer polyols made by the process comprising the steps of:
adding a charge to a reactor, where the charge comprises a a high molecular weight polyol dispersant;
providing a feed stream to the reactor, where the feed stream comprises a relatively lower molecular weight polyol having a molecular weight less than or equal to 4000, a monomer portion and an initiator suitable for polymerizing the monomer portion, where the high molecular weight polyol dispersant is in the range of about 1 to 20% of the total of all polyols.

40. The stable, low viscosity polymer polyols of claim 39 where the high molecular weight polyol dispersant is a first portion, and a second portion of the high molecular weight polyol dispersant is present in the feed stream to the reactor.

41. The stable, low viscosity polymer polyols of claim 39 where the monomer portion is a mixture of styrene and acrylonitrile in a ratio of styrene to acrylonitrile of from about 50/50 to 95/5.

42. The stable, low viscosity polymer polyols of claim 39 where the monomer portion is a mixture of styrene and acrylonitrile in a ratio of styrene to acrylonitrile of from about 65/35 to 85/15.

43. The stable, low viscosity polymer polyols of claim 39 where the viscosity of the resulting polymer polyols is less than about 8000 cps.

44. The stable, low viscosity polymer polyols of claim 39 where the reactor charge additionally comprises a relatively lower molecular weight polyol having a molecular weight equal to or less than 4000.

45. Polyurethane products made by a process comprising reacting an organic polyisocyanate with a polymer polyol in the presence of a polyurethane catalyst, where the polymer polyol is made by the process comprising the steps of:
adding a charge to a reactor, where the charge comprises a a high molecular weight polyol dispersant;
providing a feed stream to the reactor, where the feed stream comprises a relatively lower molecular weight polyol having a molecular weight less than or equal to 4000, a monomer portion and an initiator suitable for polymerizing the monomer portion, where the high molecular weight polyol dispersant is in the range of about 1 to 20% of the total of all polyols in the synthesis of the polymer polyol.

* * * * *